United States Patent [19]
Ritter et al.

[11] Patent Number: 5,053,597
[45] Date of Patent: Oct. 1, 1991

[54] METHOD AND APPARATUS FOR FABRICATING DOUBLE-LAYER, WELDED GRID BODIES

[75] Inventors: Klaus Ritter; Gerhard Ritter; Gerhard Schmidt; Anton Lassbacher, all of Graz, Austria

[73] Assignee: EVG Entwicklungs-u Verwertungs-Gesellschaft m.b.H., Graz, Austria

[21] Appl. No.: 477,827
[22] PCT Filed: May 23, 1989
[86] PCT No.: PCT/AT89/00051
§ 371 Date: Jan. 16, 1990
§ 102(e) Date: Jan. 16, 1990
[87] PCT Pub. No.: WO89/11358
PCT Pub. Date: Nov. 30, 1989

[30] Foreign Application Priority Data
May 26, 1988 [AT] Austria ................... 1387/88

[51] Int. Cl.⁵ .................................. B23K 11/00
[52] U.S. Cl. ........................................... 219/56
[58] Field of Search ............ 219/56, 58; 29/430; 140/112, 113

[56] References Cited
U.S. PATENT DOCUMENTS

| | | | |
|---|---|---|---|
| 3,579,259 | 5/1971 | Kato | 219/56 |
| 4,270,583 | 6/1981 | Tolliver | 140/92.1 |
| 4,468,550 | 8/1984 | Gött et al. | 219/56 |
| 4,500,763 | 2/1985 | Schmidt et al. | 219/58 |
| 4,505,019 | 3/1985 | Deinzer | 29/432 |
| 4,541,164 | 9/1985 | Indave | 29/430 |
| 4,748,309 | 5/1988 | Ritter et al. | 219/56 |
| 4,853,511 | 8/1989 | Ritter et al. | 219/56 |

FOREIGN PATENT DOCUMENTS

| | | |
|---|---|---|
| 0069108 | 1/1983 | European Pat. Off. |
| 0094809 | 11/1983 | European Pat. Off. |
| 3148939 | 6/1983 | Fed. Rep. of Germany |
| 3324678 | 1/1985 | Fed. Rep. of Germany |

Primary Examiner—Marvin M. Lateef
Attorney, Agent, or Firm—Frishauf, Holtz, Goodman & Woodward

[57] ABSTRACT

A method and apparatus for fabricating double-layer, welded grid bodies which consist of grids located opposite one another and web wires holding these grids apart at a distance, in which method and installation, to fabricate grid bodies in the form of annular sections, the two grids, at a mutual distance corresponding to the desired thickness of the grid body, are moved forwards concentrically to one another and in a vertical position along concentric circular feed paths, and, after the web wires, fed from the outside of the path, have been welded, preferably in pairs, to the grids, the finished grid body is removed from the outside of the path.

16 Claims, 9 Drawing Sheets

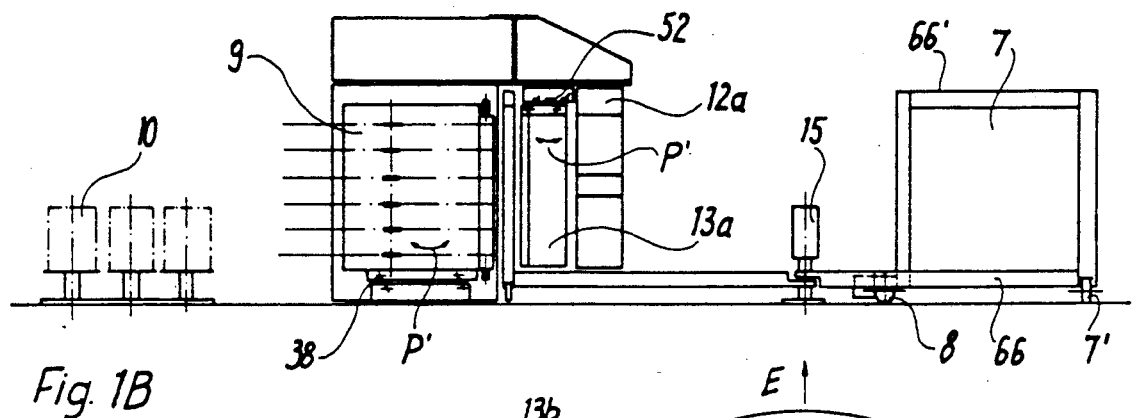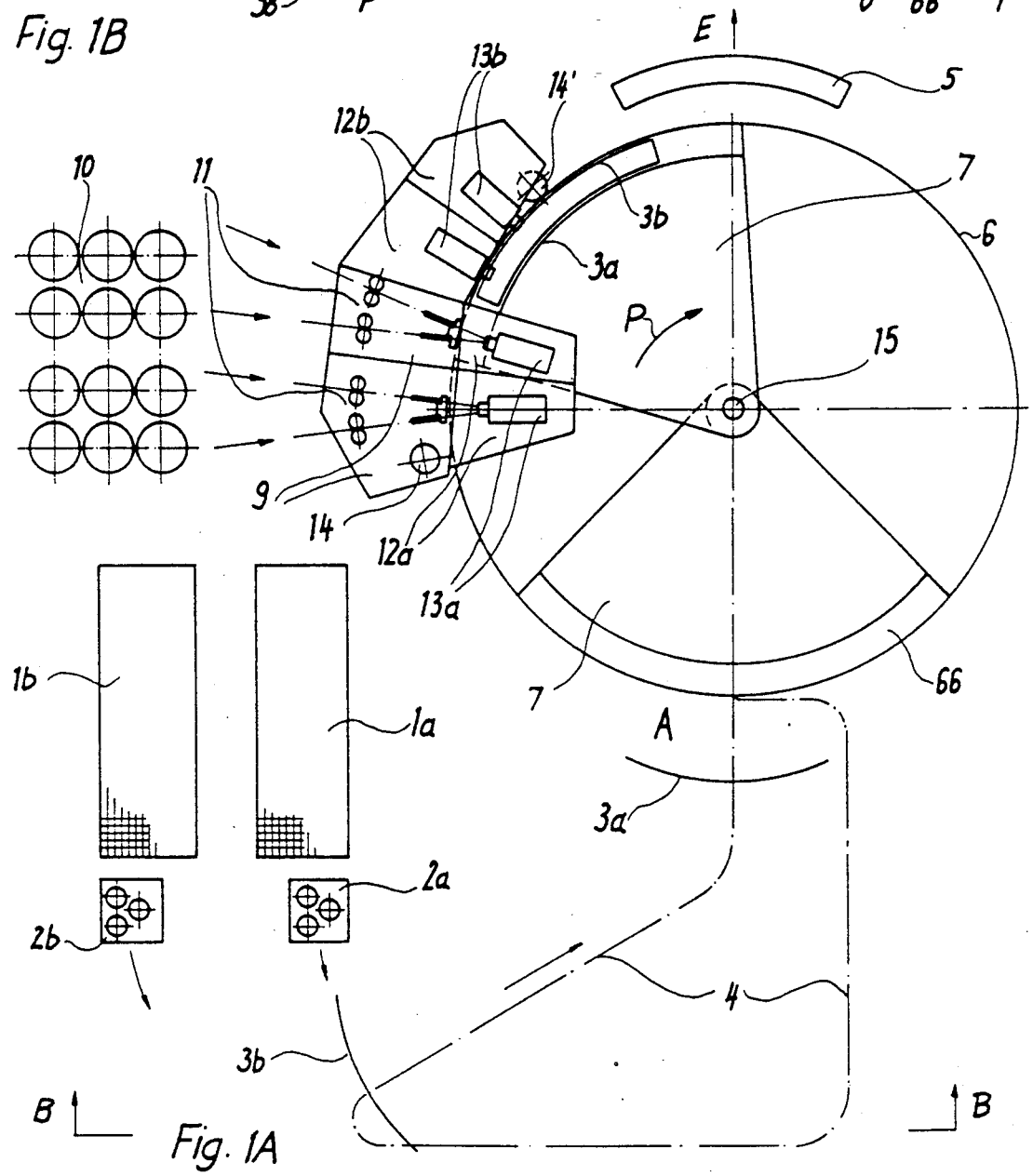

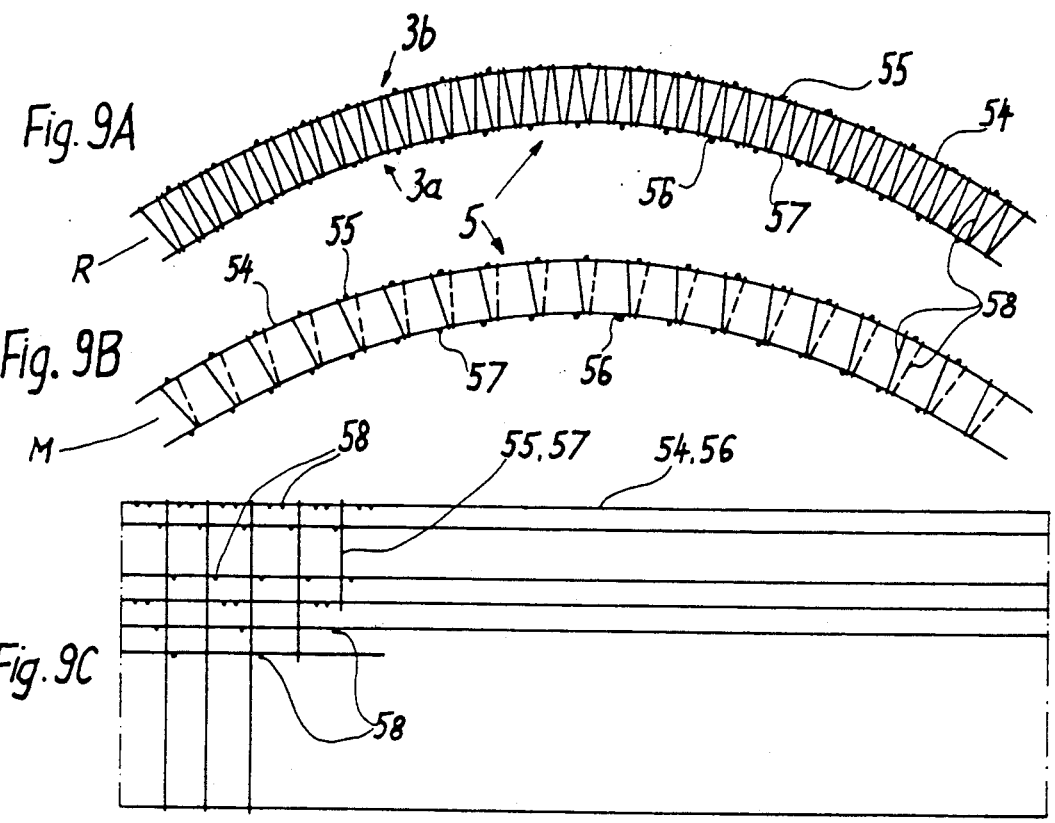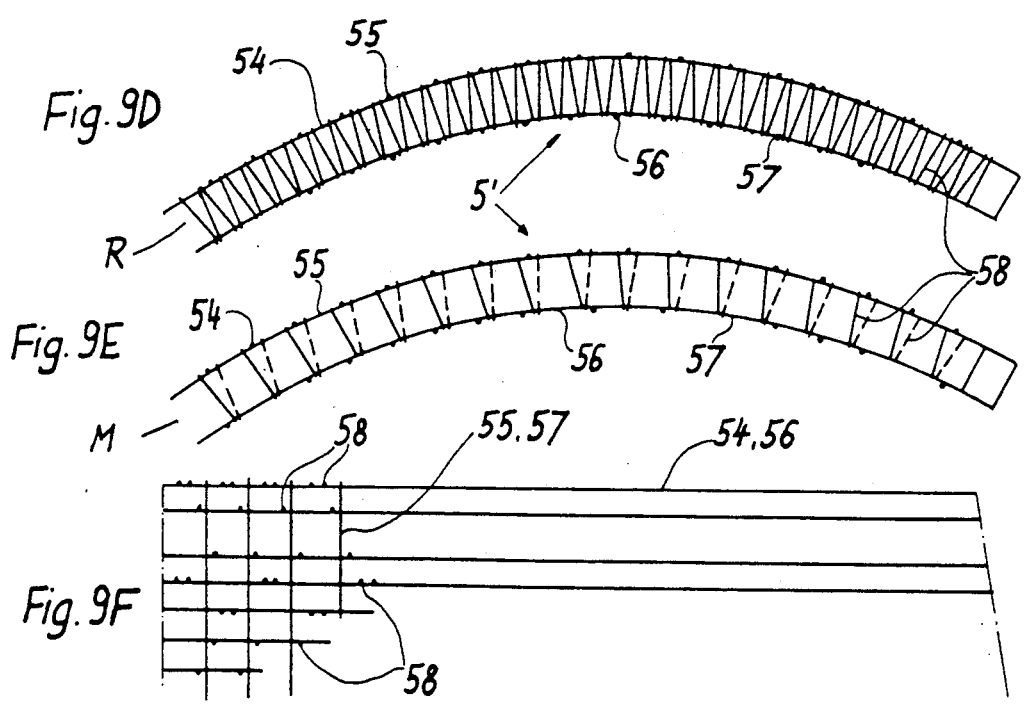

METHOD AND APPARATUS FOR FABRICATING DOUBLE-LAYER, WELDED GRID BODIES

The invention relates to a method of fabricating double-layer, welded grid bodies which are bent in a circular-arc shape and which consist of grids located opposite one another comprising longitudinal and cross wires crossing one another and welded at the intersections and of straight web wires which hold the grids apart at a predetermined mutual distance and are welded at each end to a wire of one of the two grids, in which method the grids are bent and are arranged at a distance from one another, whereupon the web wires are inserted from the outside of the grids into the intermediate space between the grids, and each web wire is welded to the adjacent wires of the grids. Furthermore, the invention relates to an installation for performing the method.

BACKGROUND OF THE INVENTION

German Offenlegungsschrift 3,148,939 discloses a method of fabricating reinforcement bodies for concrete structural parts, in which method cylindrical wire baskets for reinforcing ferroconcrete pipes are connected to one another by web wires. The cylindrical wire baskets are first supported with a horizontal axis in such a way that the axes of the wire baskets first of all do not coincide and the wire baskets are thus not concentric. A spacer is then fed horizontally in the direction of the theoretical centre point of the reinforcement body to be fabricated and is welded to the wires of the cylindrical wire baskets. After the wire baskets have been appropriately turned upwards, the following spacers are welded in one after the other. In the process, the two wire baskets move further and further apart from their initial position, which is characterized by a common contact point, until the concentricity of the two wire baskets is obtained. In this fabricating method, the concentricity is obtained only after a sufficiently large number of spacers have been welded in, since only a large number of spacers distributed at the periphery are able to carry the weight of the inner or outer wire basket not supported by the rollers or the drum. This known procedure is not only relatively complicated but has in particular the disadvantage that the spacers as well as their weld locations on the wire baskets are subjected to considerable bending stress. In addition, the known procedure can only be applied to wire baskets which consist of complete circles but not to grid bodies of annular sections, for only wire baskets of complete circles are dimensionally stable in such a way that they can be worked without workpiece-dependent mechanisms and can be moved into a concentric position by simple turning after the spacers have been welded in.

SUMMARY OF THE INVENTION

The object of the invention is to create a method of the type specified at the beginning and an installation for performing the method with which double-layer, welded grid bodies bent in a circular-arc shape can be fabricated in a simple manner in a continuous operation, which grid bodies consist of annular sections and their spacers are stress-free.

The method according to the invention has the features from that, to fabricate grid bodies in the form of annular sections, the two grids, at a mutual distance corresponding to the desired thickness of the grid body, are moved forwards concentrically to one another and in a vertical position along concentric circular feed paths, and that, after the web wires have been welded, preferably in pairs, to the grids, the finished grid body is removed from the outside of the path.

This procedure enables grid bodies of annular sections having stress-free spacers and weld locations to be satisfactorily fabricated in a continuous operation. According to the invention, the concentricity of the grids is accurately defined from the beginning in particular as a result of the circular feed to which the grids and the grid body are subjected in a definite manner.

The grids are preferably fed in the form of prefabricated grid mats which, before they are arranged on the circular feed paths, are bent in accordance with the path radius.

The subject-matter of the invention is also an installation or apparatus which is intended for performing the method and has feed paths for grids located opposite one another, a grid feeding station allocated to the feed paths, and a web-wire feeding station which is arranged to the side of the feed paths and has web-wire feeding means whose wire feed routes run across the feed paths, in which arrangement, a welding device having welding tongs and intended for the welding of the free wire ends to one grid is provided on the other side of the feed paths in alignment with the wire feed routes, and a welding device having welding tongs and intended for welding the cut ends of the web wires to the other grid is provided on this side of the feed paths downstream in the feed direction; this installation is characterized according to the invention in that the feed paths, in accordance with the bending radius of the grid body to be fabricated, are curved in a circular shape and are also arranged concentrically and have a common vertical axis, in that the grid feeding station allocated to the feed paths is equipped with bending mechanisms for the two grids, in that the web-wire feeding station downstream from the grid feeding station in the feed direction is arranged on the outside of the feed paths, in that the web-wire feeding station as well as the welding devices are mounted in such a way that they can be pivoted towards and away from the feed paths, and in that a removal station for the finished grid bodies is likewise provided on the outside of the feed paths.

In a preferred embodiment of the invention, in order to work grids fed in the form of endless grid lengths, guide and feed devices for the grid lengths and the grid body as well as, in front of the removal station, a mechanism for cutting to length the finished grid bodies are provided on the feed paths.

Alternatively, in order to work grids in the form of grid mats, a grid-mat clamping mechanism is provided which is guided on the feed paths and can be moved out of the grid feeding station through the web-wire feeding and welding stations into the grid-body removal station.

BRIEF DESCRIPTION OF THE DRAWING

The invention and further features of the same are described in greater detail below with reference to exemplary embodiments and the drawings, in which:

FIG. 1A schematically shows in plan view an apparatus for fabricating bent, welded grid bodies according to the invention, and FIG. 1B shows the same in an elevation in the direction of arrows B—B in FIG. 1A;

FIGS. 9A-9F show sections and elevations of bent, welded grid bodies.

DETAILED DESCRIPTION OF THE DRAWINGS

Figure 2:
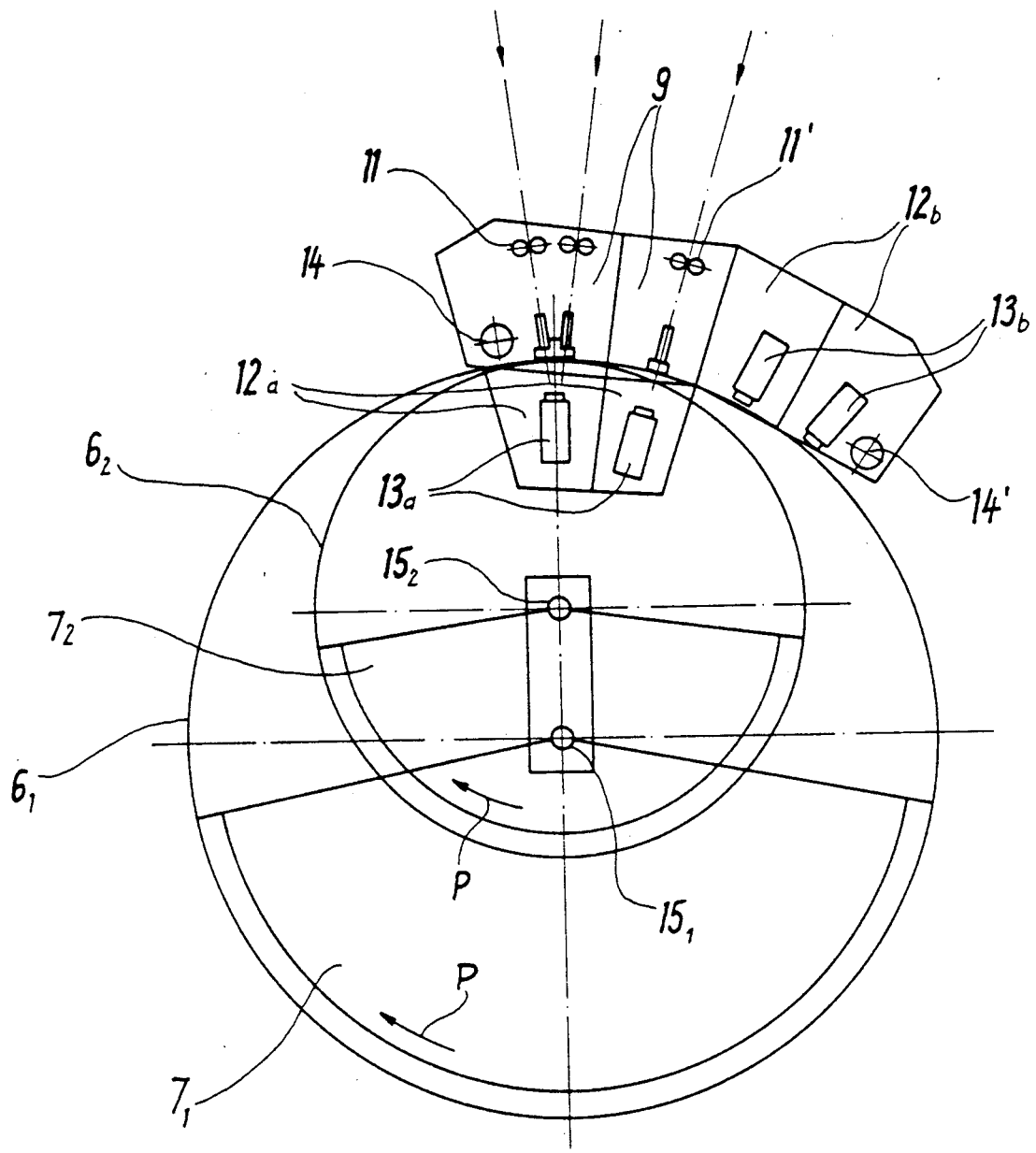
FIG. 2 shows in plan view a modified embodiment of the apparatus according to the invention.

The double-layer, bent, welded grid body 5, 5' fabricated by the apparatus according to the invention has, according to FIG. 9A-9F, an outer grid mat 3b, consisting of longitudinal wires 54 and cross wires 55, an inner grid mat 3a, consisting of longitudinal wires 56 and cross wires 57, and web wires 58 which connect the two grid mats and serve in particular to stiffen the grid body and as shearing-force reinforcement. As shown in FIGS. 9C and 9F, the web wires 58 can be welded to the longitudinal wires 54, 56 both below and above the latter.

FIGS. 9A and 9B and respectively 9D and 9E in each case show two sections through the grid bodies 5, 5' in order to show various possible combinations for the arrangement of web wires 58 in the grid body. The sections according to FIGS. 9A and 9D each show a complete complement with web wires 58, arranged for example at an acute angle to one another, as they are conveniently used at the top and bottom margin of the grid body for reasons of optimum stiffening of the same. The sections according to FIGS. 9B and 9E are each taken through a centre portion of the grid body and show further possible combinations for the arrangement of web wires, a web-wire layer which is located deeper or higher being indicated by broken lines in each case.

The method and the apparatus according to the invention enable grid bodies to be fabricated for different applications with any combination of web wires; this applies in particular to their number per longitudinal wire layer, their relative arrangement in the various layers, their direction in the grid body relative to the longitudinal wires, and also their diameter, which can likewise vary. Here, as shown in the elevations according to FIGS. 9C and 9F, different combinations of web wires are also possible within a longitudinal-wire layer.

In addition, FIGS. 9D to 9F reveal that an outer margin of the grid body 5' can be designed to have a slope.

An apparatus according to the invention for fabricating the grid body 5 bent in a circular-arc shape is shown in FIGS. 1A and 1B. An inner, at first flat grid mat 3a which consists of longitudinal wires 56 and cross wires 57 welded to one another is removed from a mat magazine 1a and is given the desired bent shape in a bending mechanism 2a. The bending mechanism 2a can, for example, consist of three drivable rollers which are connected by means of a chain and whose distance from one another can be set, as a result of which the radius of curvature of the longitudinal wires of the grid mat and thus also of the grid body to be fabricated is adjustable within certain limits. If grid mats which are less rigid and have, for example, thin longitudinal wires which can easily be bent without great expenditure of force are used, and also if the grid body to be fabricated has very large radii of curvature, the bending mechanism can be omitted if necessary.

On a mat conveying path 4, the inner grid mat 3a is fed to a mat clamping mechanism 7 located in the grid feeding station A and, as will be described below, is fixed in an upright position in this mat clamping mechanism 7. In the same way, an outer grid mat 3b, which likewise consists of longitudinal wires 54 and cross wires 55 welded to one another but can differ from the inner grid mat 3a in its construction, is removed from a further mat magazine 1b and is given the necessary curvature in its longitudinal wires in the associated bending mechanism 2b. On the mat conveying path 4, the bent grid mat 3b is fed to the mat clamping mechanism 7 and is likewise fixed in an upright position in the latter.

In plan view, the mat clamping mechanism 7 has a circular-sector-shaped frame which is arranged in such a way that it can be moved by means of wheels 7' on a circular track 6 having a vertical axis and is rotatably arranged in the track centre 15. In addition, rotatable electric-power and control lines as well as supply lines for hydraulically and pneumatically operable elements of the mat clamping mechanism 7 are located in the track centre 15.

After it has been completely loaded, the mat clamping mechanism 7 travels, with the aid of a drive device 8 mounted on its frame, on the track 6, defining concentric circular feed paths for the mats, from the grid feeding station A in the direction of arrow P between a first web-wire feeding station 9, arranged outside the track 6, and an inner welding station 12a, located exactly opposite the web-wire feeding station 9 inside the track 6, until a shoot-in position for a first vertical roll of web wires is reached.

At this location, the drive device 8 is stopped and the further cyclic feed of the mat clamping mechanism 7 is now taken over by a positioning drive device 14 which is provided in the entry area of the first web-wire feeding station 9 and has a drive pinion which is displaceable in the radial direction and can be meshed with a toothed rack of the mat clamping mechanism 7.

From supply coils 10, for example via a coil or reel run-off, the web wires 58, by means of feeding mechanisms 11 which each essentially consist of a roller shoot-in device and shears, as will be described below, are shot into corresponding positions at the longitudinal wires 56 of the inner grid mat 3a, are cut to length and are welded to the longitudinal wires 56 of the inner grid mat 3a in the inner welding device 13a.

During the shoot-in action of the web wires 58, the web-wire feeding station 9, in which feeding mechanisms 11 are arranged in the vertical direction in accordance with the maximum number of web wire layers to be shot in, and inner welding device 13a, in which welding tongs 42 are arranged in a vertical direction in at least the same number, perform the pivoting movement, shown in the elevation by arrows P', in the direction of the grid mats 3a, 3b. The pivoting movement of the web-wire feeding station 9 is effected by a pivot device 38, and the synchronous pivoting movement of the inner welding device 13a is effected by a pivot device 52. After the pivoting actions are complete, the web-wire feeding station 9 as well as the inner welding device 13a pivot back into their initial position.

In accordance with the desired arrangement of the web wires, the mat clamping mechanism 7 is now fed to the next web-wire feeding station 9 and the inner welding station 12a located opposite the latter, where, with the corresponding pivoting movements of the wire feeding station 9 and the welding device 13a being performed, web wires are again shot in, cut to length and welded to the inner grid mat 3a.

The next feed steps move the mat clamping mechanism 7 into following outer welding stations 12b arranged on the outside of the track 6 and having corresponding outer welding devices 13b. In these welding devices 13b, which, just like the inner welding devices 13a, contain a plurality of vertically arranged welding tongs 42 and likewise perform a pivoting movement in the direction of the grid mats 3b into the welding position, the web wires 58 are also welded to the longitudinal wires 54 of the outer grid mat 3b. After the welding operations are complete, the outer welding devices 13b likewise pivot back again into their initial position.

It will be understood that, during these feed steps, web wires can be fed again by means of the mechanisms 11 and welded on by means of the inner welding devices 13a.

In accordance with the predetermined arrangement of the web wires, further cyclic feeds of the mat clamping mechanism 7 take place so that web wires 58 are shot in at the respective positions and are welded on on the inside and on the outside until the grid body 5 is completely fitted with web wires. In relation to the curve length of the outer frame part 66 of the mat clamping mechanism 7 and to the dimensions of the welding stations 12a, 12b, a positioning drive device 14' arranged at the end of the outer welding station 12b here takes over the further feed of the mat clamping mechanism 7.

As soon as the grid body 5 is finished, the mat clamping mechanism 7, under the action of the drive device 8, travels into a removal station E in which the finished grid body 5 is removed and is fed to a further processing means or a stacking means. The empty mat clamping mechanism 7 then travels further into the grid feeding station A and the operating cycle described begins again.

The web-wire feeding station 9 and inner and outer welding station 12a, 12b having the corresponding welding devices 13a, 13b, as shown, for example, in FIG. 1, can each be present in duplicate so that a plurality of operations can be performed simultaneously and thus the production speed of the welding installation can be increased. Here, all web-wire feeding stations 9 and all welding devices 13a, 13b are individually controllable and only the sequences of movement of the web-wire feeding stations 9 with the allocated, oppositely located inner welding devices 13a are coordinated with one another.

It is of course also possible to provide the abovementioned stations 9 and 12a, 12b in any number, the maximum possible number in principle being limited only by the space requirement for the individual stations and for the operating sequence of the method, such as the space requirement for feeding the grids and removing the grid body.

The individual web-wire feeding stations 9 as well as the inner and outer welding stations 12a, 12b are displaceable relative to one another and in the direction of the track 6 on a base plate (not shown) so that these stations, in their position relative to one another and towards the track, can be adapted to the geometry of the grid bodies to be fabricated.

To increase the productivity of the installation, a plurality of mat clamping mechanisms 7 of the same type can be used, as is likewise shown in FIG. 1, all mat clamping mechanisms successively performing the individual steps of the method such as the loading with grid mats, the shooting in and welding of the web wires and the removal of the finished grid body.

Figure 3:
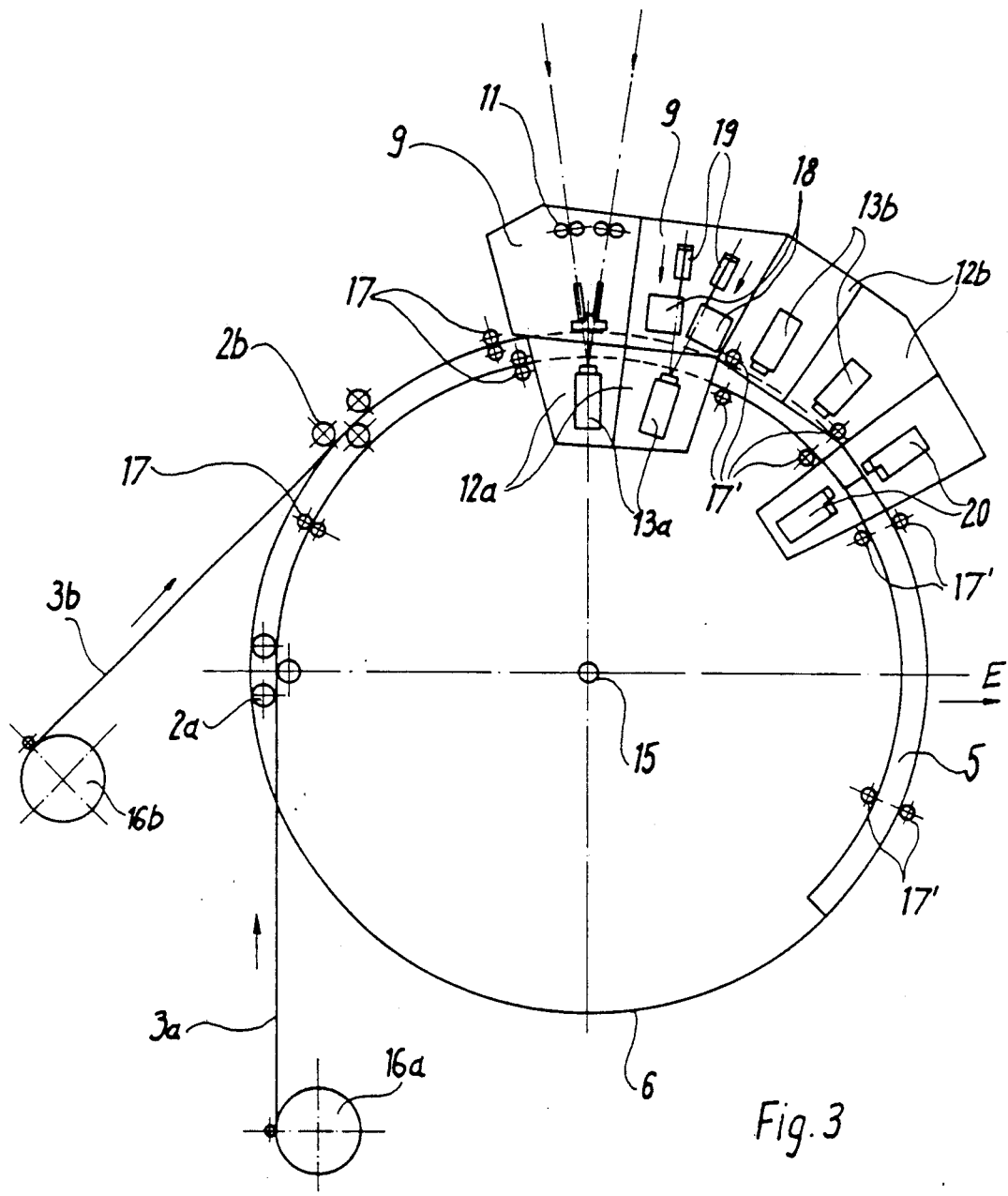
FIG. 3 shows a third embodiment of the apparatus in plan view.

FIG. 2 shows a further exemplary embodiment of an installation according to the invention, which can also be combined with the exemplary embodiments of installations according to the invention shown in FIGS. 1 and 3. To fabricate grid bodies 5 having different radii of curvature, as are necessary, for example, for the reinforcement of tunnel tubes of different sizes, two tracks $6_1$ and $6_2$, for example, having a vertical axis are provided, the radii of curvature of the tracks and the dimensions of the mat clamping mechanisms being adapted to the radii of curvature of the grid bodies. Since the web-wire feeding stations 9 and the welding stations 12a, 12b are constructed so as to be in a fixed position if possible, the centre points of the tracks $6_1$, $6_2$, differing in radius, and thus the centres $15_1$, $15_2$ of rotation of the mat clamping mechanism $7_1$, $7_2$ are displaced relative to one another in such a way that the tracks $6_1$, $6_2$ touch in the first welding position, which is located between the first web-wire feeding station 9 and the first inner welding station 12a. To fabricate grid bodies 5 having a smaller radius of curvature, the centre $15_1$ of rotation applicable to a mat clamping mechanism $7_1$ having a large radius is shifted in the direction of the first welding position so that a centre $15_2$ of rotation for a mat clamping mechanism $7_2$ having a smaller radius is obtained. So as not to disturb the sequence of movements, the mat clamping mechanism $7_1$ is removed and only the mat clamping mechanism $7_2$ with the associated track $6_2$ having the smaller radius of curvature is used.

In addition, the second web-wire feeding station 9 and the welding stations 12a, 12b are if necessary displaced in the direction of the track $6_2$.

Furthermore, a further exemplary embodiment of a feeding device 11' with which only individual stiffening wires can be fed is shown in FIG. 2 in the second web-wire feeding station 9.

In a further embodiment of the invention shown in FIG. 3, the grid bodies can be fabricated by a continuous method of fabrication. Here, from a supply roller 16a, an endless inner grid length 3a, and, from a further supply roller 16b, an endless outer grid length 3b are advanced from the outside and tangentially up to the track 6 and corresponding preforming stations 2a and 2b which, in this exemplary embodiment, are located directly in the area of the track 6. The bending stations 2a, 2b are driven accordingly and draw off the grid lengths in cycles from the supply rollers 16a, 16b and feed the grid mats 3a, 3b, which are now bent. The grid mats 3a, 3b are guided along the track 6 by means of additional guide rollers 17, which are arranged on both sides along the feed path of the inner and outer grid mats in the feed direction in front of the welding stations 12a, or by means of guide rollers 17' which are in each case arranged on both sides outside the grid body along the track inside and, in the feed direction, behind the welding stations 12b. The guide rollers 17' which lie behind the welding stations 12b can be provided with an additional feed drive (not shown) in order to feed the finished grid body 5, cut off from the line of material by means of shears 20, in an accelerated manner to the removal station E.

A further embodiment of a feeding mechanism for cut-to-length web wires is shown in FIG. 3, it also being possible for this web-wire feeding mechanism to be combined with the installations according to the invention which are shown in FIGS. 1 and 2. By means of this feeding mechanism, stiffening wires 58 already cut to length are shot from the supply magazines 18 by means of web-wire feeders 19 into the corresponding position into the grid bodies.

Figure 4:
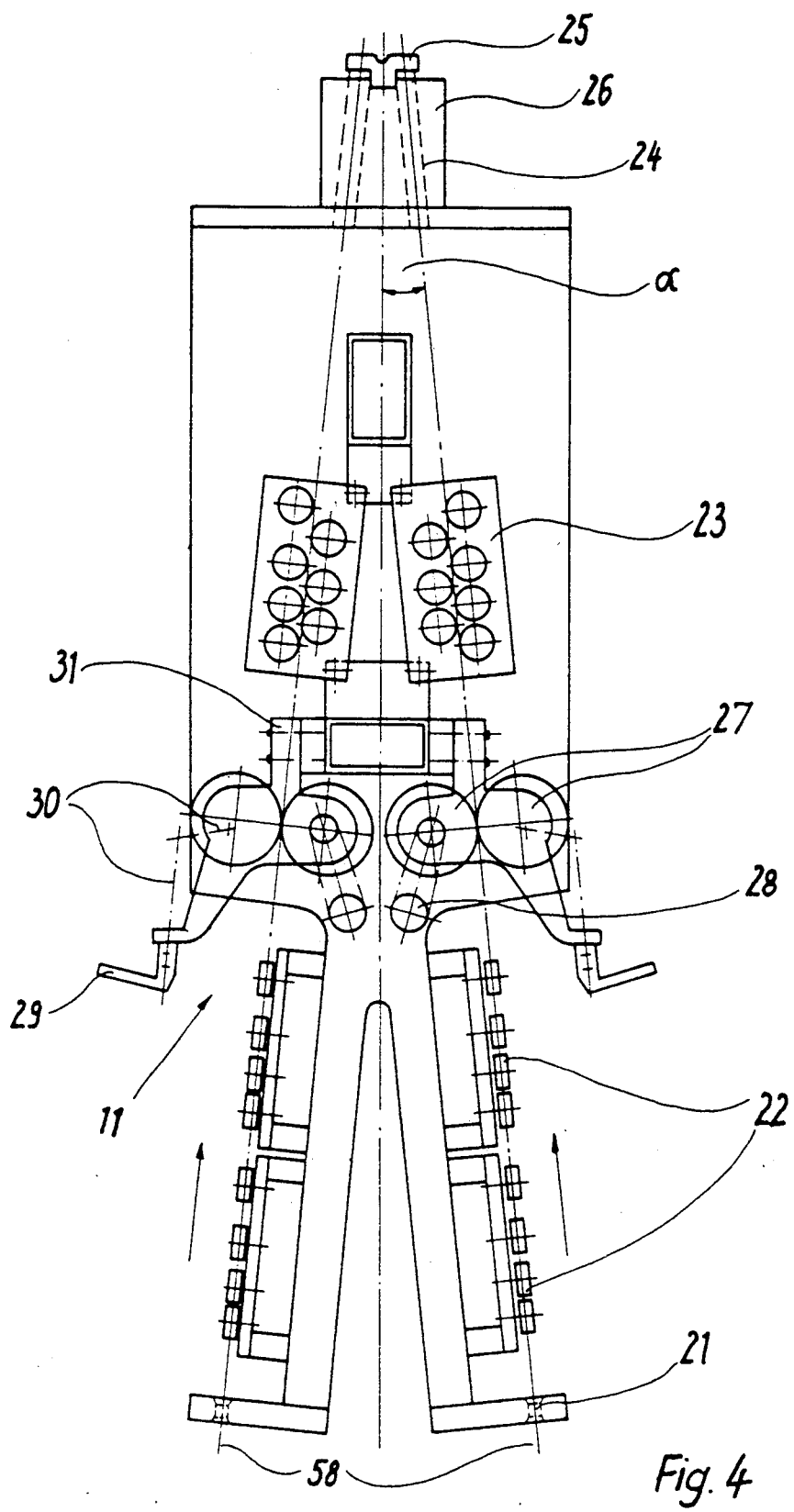
FIG. 4 shows a feeding mechanism for a web wire in plan view.

FIG. 4 shows an embodiment of a mechanism 11 according to the invention for simultaneously feeding two web wires running in a convergent manner at an acute angle. This mechanism is also suitable for feeding only a single web wire if, for example, only one feeding channel is used.

The web wires 58 enter via guide nozzles 21 into the feeding device 11, pass through vertically arranged alignment rollers 22 and horizontally arranged alignment rollers 23 in which the web wires 58 are straightened and then pass into cutting nozzles 24 which, together with the cutting blade 25, are located on a cutting beam 26. Web wires 58 are fed by means of feed wheels 27 which are arranged between the alignment rollers 22 and 23 and are pressed against the web wires 58 by means of a clamping lever 29 and an eccentric lever 30, in which arrangement an improved frictional connection can be obtained by suitable design of the running surfaces, such as, for example, toothing or knurling.

The length of the web wire to be shot in is measured by means of a measuring wheel 28, connected to a shaft 33 of the feed wheels 27, for example by means of toothed belts, and a measuring transducer 35. After the target length is reached, the feed is stopped, the welding tongs 42 of the inner welding devices 13a are closed in order to fix the web wire 58 on the longitudinal wire 56 of the inner grid mat 3a, and the web wire 58 is cut off from the line of material by means of the cutting blade 25 vertically movable on the cutting beam 26.

Drawn in FIG. 4 is the shoot-in angle α of the web wires, defined as the angle between the respective shoot-in path of the web wires and the respective normal to the tangential plane to the inner bent grid mat at the location of the respective welding positions at the longitudinal wires 56 of the inner grid mat.

Figure 5:
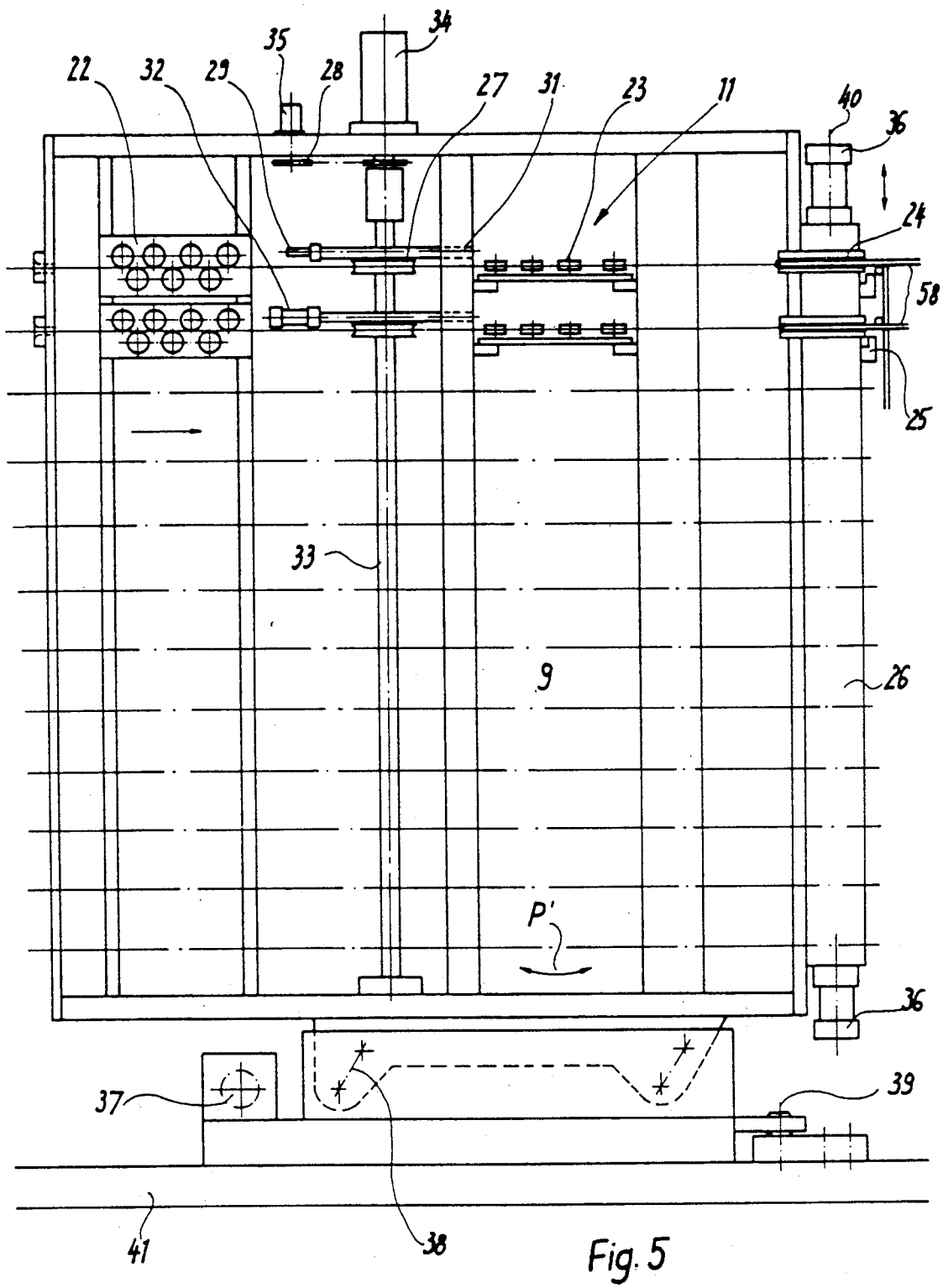
FIG. 5 shows a side view of the web-wire feeding station of the apparatus.

As can be seen from FIG. 5, a plurality of feeding devices 11 or 11′, each of which can be vertically adjusted and secured in position by means of a clamping device 31, for web wires are arranged vertically in a row in the web-wire feeding station 9, the feed wheels 27 of each individual feeding device being arranged in such a way that they can be vertically adjusted and locked in position on the common shaft 33, which can be driven by a drive device 34.

The clamping levers 29 on the eccentric lever 30 can be replaced, for example, by hydraulically operable clamping cylinders 32 so that the web wires 58 can be controlled for shooting in or not shooting in. The cutting movement of the cutting blades 25 is performed by two cutting cylinders 36 which can be controlled alternately.

The aforementioned pivoting movement of the wire feeding station 9 (arrow P′), which takes place at the same time as the feed of the web wire 58 in the direction of the grid mats 3a, 3b and back again into the initial position after the welding and cutting operations are complete, is performed by means of a crank-pivot drive 37 and a pivot device 38 formed from guide links.

For the purpose of changing the shoot-in angle α of the web wires which is indicated in FIG. 4, the wire feeding station 9 can be connected to a base plate 41 in such a way as to be pivotable about the pivot axis 39. If necessary, the shoot-in angle α can also be changed by pivoting the cutting beam 26 about its axis 40.

Figure 6:
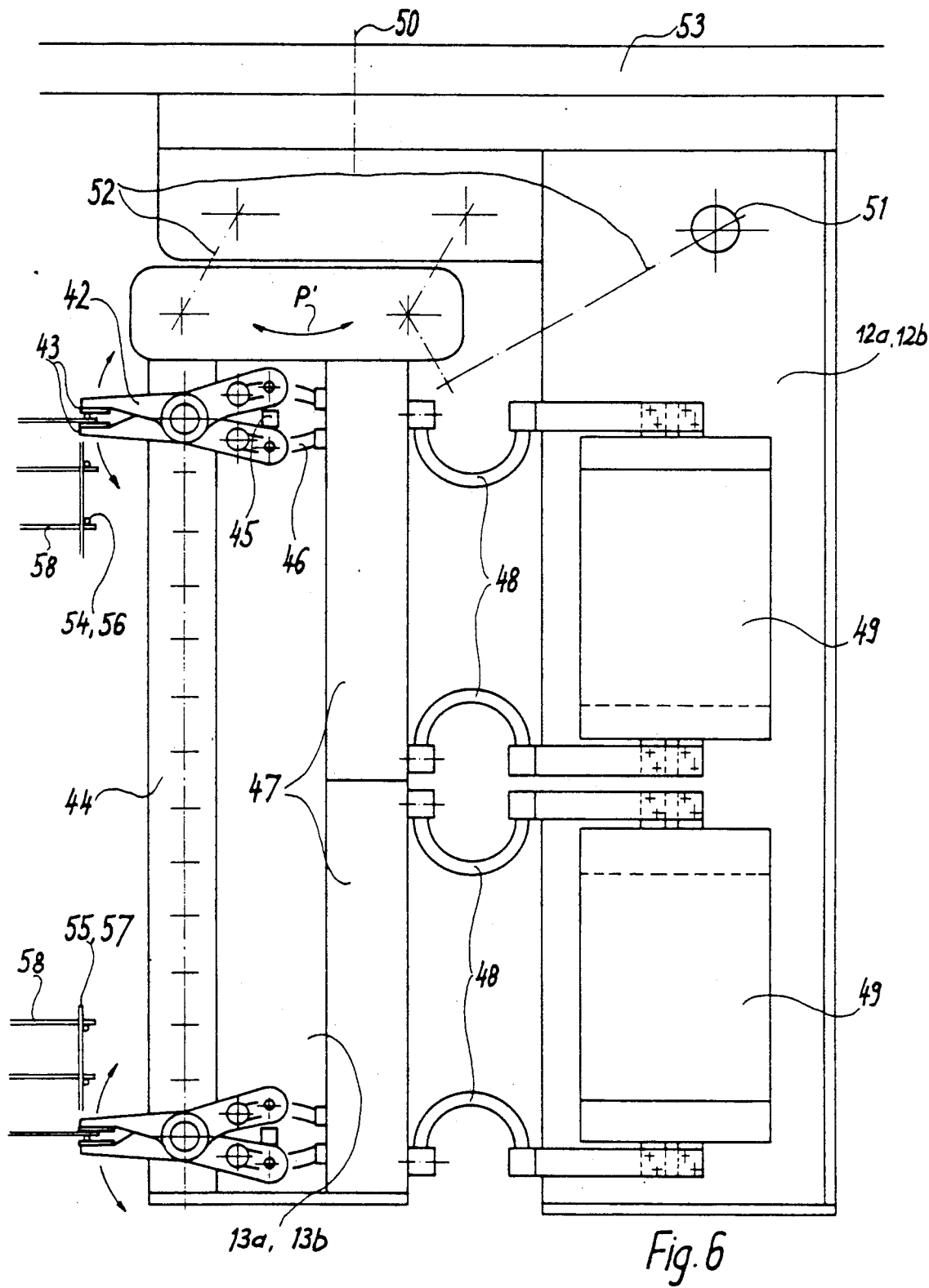
FIG. 6 shows a part of the welding station of the apparatus according to the invention.

FIG. 6 shows an exemplary embodiment for the welding stations 12a, 12b. A plurality of welding tongs 42 having welding electrodes 43 are arranged in such a way that they can be vertically adjusted and secured in position on a welding-tongs stand 44. The welding tongs 42 are actuated by means of welding cylinders 45, in which arrangement the welding pressure can be adapted to the diameters of the wires to be welded.

The requisite welding current, likewise adapted to the diameters of the wires to be welded, is supplied from welding transformers 49 to bus-bars 47 via conduction bands 48 which permit the pivoting movement of the welding device 13a, 13b, which essentially consists of the welding-tongs stand 44, the welding tongs 42 and the bus-bars 47. From the bus-bars 47 the current is fed to the welding tongs 42 via flexible electric power cables 46.

The number and the circuit wiring of the welding transformers 49 and of the bus-bars 47 as well as subsequently of the electric tongs 42 is selected in accordance with the number and cross-sections of the wires to be welded in the different combinations 54, 58 and 56, 58.

The welding electrodes 43 are preferably designed to be of large area. Consequently, as indicated in the feed and welding diagram according to FIG. 8, a plurality of stiffening wires 58 can also be welded at the same time as the corresponding longitudinal wires 54, 56 and, if need be, slight deviations in the positioning of the web wires 58, caused for example by different shoot-in angles α, can be tolerated.

As already mentioned, the welding device 13a, in synchronism with the shoot-in feed of the web wires, and the welding device 13b, by means of a crank-pivot drive 51 and a pivot device 52 formed by guide links, perform a pivoting movement (arrow P′) into the welding position and, after the welding is complete and the welding tongs 42 have opened, a pivoting movement in the opposite direction back into the initial position.

For the purpose of changing the welding position on the longitudinal wires, due to any change which may arise in the shoot-in angle α of the web wires, the welding stations 12a, 12b are pivotably mounted on a base frame 53 about a pivot axis 50.

Figure 7:
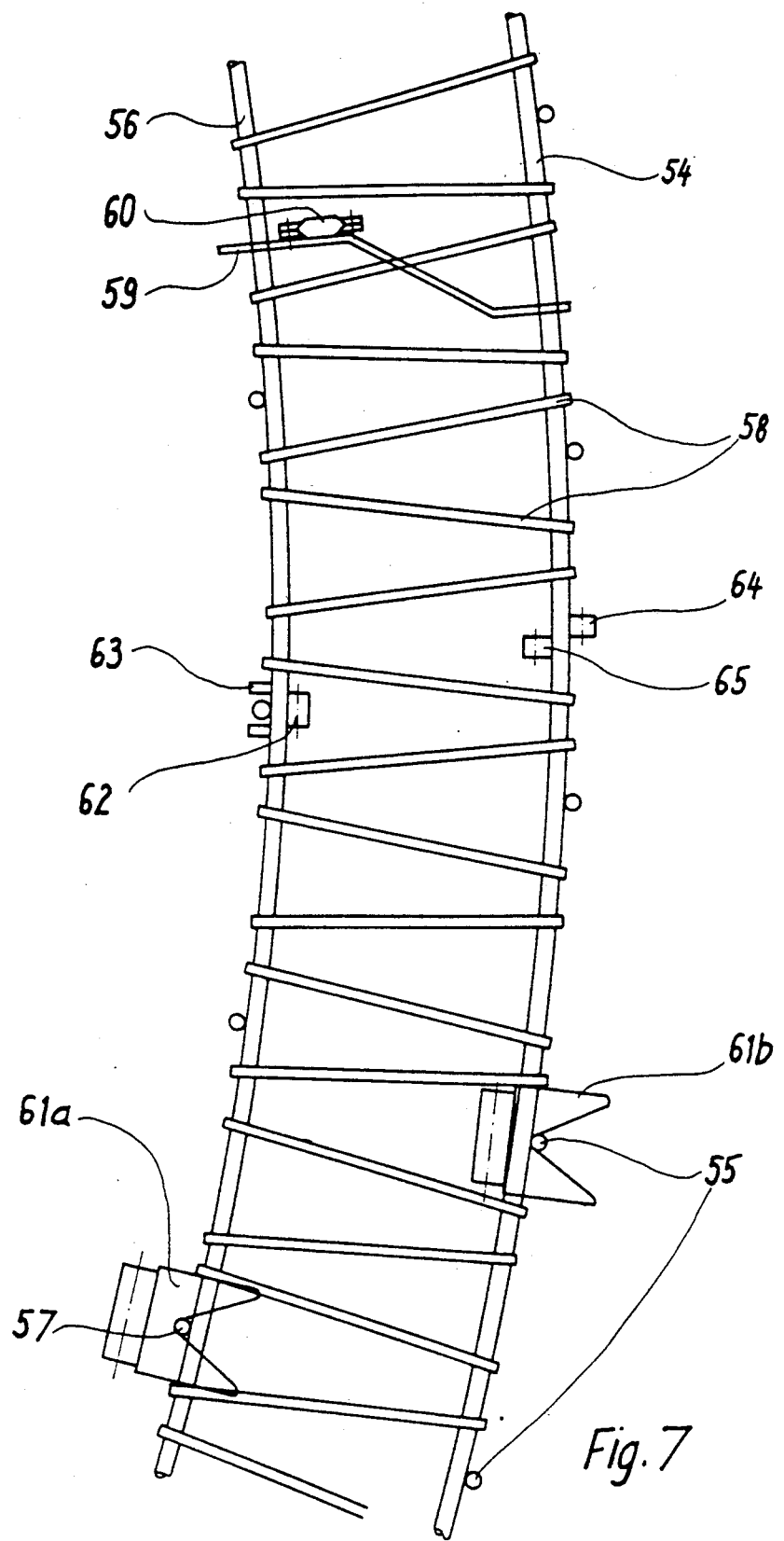
FIG. 7 shows a mat clamping mechanism in plan view.

In the representation of the mat clamping mechanism in FIG. 7, the centre 15 of rotation, the base frame and the drive 8 are omitted and only the elements on the bottom, curved part 66 of the mat clamping mechanism 7 are shown, which elements are necessary for the positioning and fixing of the grid mats 3a, 3b inside the mat clamping mechanism 7.

In the grid feeding station A of the welding installation, to load the mat clamping mechanism with grid mats, first of all mat positioning devices 59, of which there are several in the mat clamping mechanism, for the longitudinal wires 54, 56 are moved along guides 60 by means of actuating elements (not shown), such as, for example, pneumatic cylinders, and inner mat center means 61a, of which there are likewise several, for the cross wires 57 are moved by a pivoting movement into their working position, as a result of which the inner grid mat, with its longitudinal wires 56 and its cross wires 57, is exactly determined in its position in the mat clamping mechanism 7.

After it is inserted, the inner grid mat 56, 57, by means of pivotable inner clamping grips 62, of which there are likewise several, is clamped in place against oppositely located fixing stops 63 of the clamping grips. As soon as the clamping grips 62 are closed, inner mat centering means 61a open and outer mat centring means 61b, of which there are likewise several, pivot into their working position, as a result of which, together with the mat positioning devices 59, the position of the outer grid mat, with its longitudinal wires 54 and its cross wires 55, in the mat clamping mechanism 7 is now also exactly determined.

After the outer grid mat 54, 55 is inserted, the same is fixed by outer clamping grips 64, of which there are several, swinging in against oppositely located outer mat stops 65, which can likewise be swung in.

As soon as the clamping grips 64, 65 are closed, the outer mat centering means 61b open again and the mat positioning devices 59, which are no longer required, are lowered into their initial position.

The clamping grips 62, 64, 65 are closed in groups, which operation is preferably started at the margins of the grid mats so that distortion of the grid mats is avoided.

The number of mat positioning devices 59, mat centering means 61a, 61b and also inner clamping grips 62 plus the fixing stops 63 and outer clamping grips 64, 65 depends on the length and inherent rigidity of the inner and outer grid mats.

The clamping grips 62, 64, 65 as well as the fixing stops 63, for the purpose of fixing the two uppermost longitudinal wires 54, 56 of the grid mats, are also present on an upper, curved part 66' of the mat clamping mechanism 7 and are controlled and actuated in synchronism with the corresponding elements on the lower curved part 66 of the mat clamping mechanism.

In the removal station E of the welding installation, the finished grid body 5 is seized by means of gripping attachments which are extended from the outside of the track 6, and the clamping grips 62, 64, 65 open and release the grid body for removal.

For the purpose of adapting the individual elements of the mat clamping mechanism to the different geometry of various grid bodies to be fabricated, in particular to the different spacings of the longitudinal and cross wires of the grid mats, the corresponding elements of the mat clamping mechanism are attached in such a way that they can be secured in position, are if necessary vertically adjustable and are horizontally displaceable on the lower and upper curved parts 66 and 66' respectively of the mat clamping mechanism 7.

The curve length of the curved parts 66, 66' of the mat clamping mechanism 7 can be adapted to the grid bodies to be fabricated, but it is also possible, while appropriately positioning the positioning, centring, clamping and fixing elements 59, 61a, 61b, 62, 63, 64, 65 in the mat clamping mechanism 7, to arrange grid mats which are shorter than the curve length of the curved parts 66, 66', as shown, for example, in FIG. 1, or also to arrange more than one grid mat pair 3a, 3b.

Figure 8:
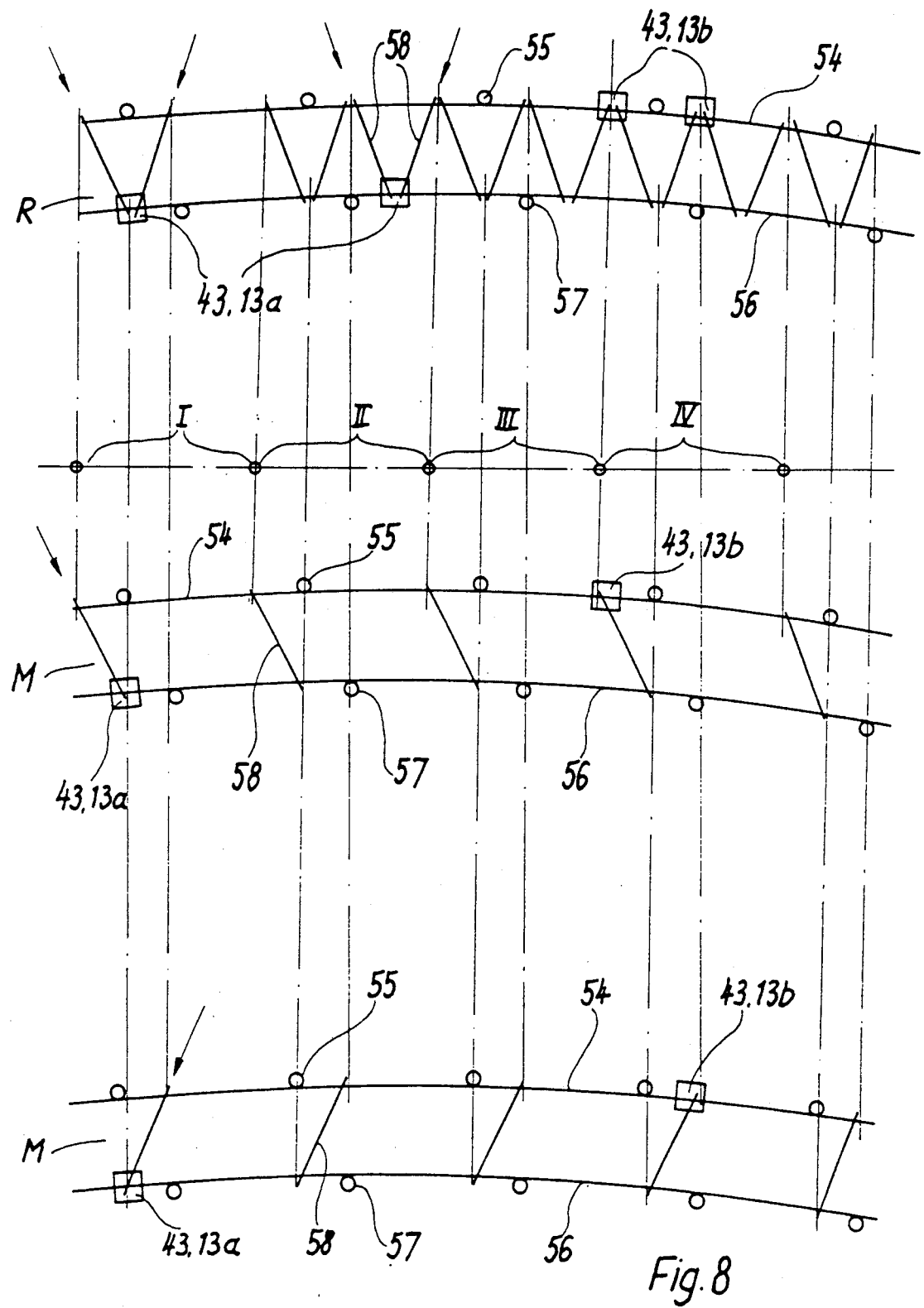
FIG. 8 shows an example of a feed and welding diagram.

In the feed and welding diagram according to FIG. 8, an exemplary embodiment for the welding of the web wires at the upper margin R of a grid body as well as in two centre layers M of this grid body is shown in perspective representation. In this schematic representation, the welding electrodes 43 are indicated in a square shape, but they can have any shape suitable for simultaneously welding a plurality of web wires 58 to the longitudinal wires 54, 56.

Furthermore, the various feed and welding cycles I-IV of the welding installation are shown. The arrows shown represent the shoot-in directions of the web wires at the appropriate positions.

It will be understood that the welding installation, in view of the complex operating sequence of the method, is conveniently equipped with an automatic control system which monitors, coordinates and controls the sequences of movement of the individual components of the installation and also provides at the right moment the adjustable parameters, necessary for fabricating different grid bodies, for performing the method according to the invention, such as, for example, the grid body type, the choice and number as well as the shoot-in angle of the web wires in the various layers of the grid body, the step length and the number of feed cycles, etc.

The exemplary embodiments described can be modified in various ways within the scope of the general concept of the invention, in particular with regard to the number of web-wire feeding and welding stations connected one behind the other.

We claim:

1. Method of fabricating double-layer, welded grid bodies, which are bent in a circular-arc shape and which have grids located opposite one another comprising longitudinal and cross wires crossing one another and welded at the intersections and of straight web wires which hold the grids apart at a predetermined mutual distance and are welded at each end to a wire of one of the two grids, in which method the grids are bent and are arranged at a distance from one another, whereupon the web wires are inserted from the outside of the grids into the intermediate space between the grids, and each web wire is welded to the adjacent wires of the grids, characterized in that, to fabricate grid bodies in the form of annular sections, the two grids, at a mutual distance corresponding to the desired thickness of the grid body, are moved forwards concentrically to one another and in a vertical position along concentric circular feed paths, and in that, after the web wires have been welded, preferably in pairs, to the grids, the finished grid body is removed from the outside of the path.

2. Method according to claim 1, characterized in that the grids are fed in the form of prefabricated grid mats which, before they are arranged on the circular feed paths, are bent in accordance with the path radius.

3. Method according to claim 1, characterized in that the grids are fed to the feed paths in the form of endless grid lengths and, when they are inserted into the feed paths, are bent in accordance with the feed-path radius.

4. Apparatus for a method for fabricating double-layer, welded grid bodies which are bent in a circular-arc shape and which have grids located opposite one another having feed paths for grids located opposite one another, a grid feeding station allocated to the feed paths, and a web-wire feeding station which is arranged to the side of the feed paths and has web-wire feeding means whose wire feed routes run across the feed paths, in which arrangement, a welding device having welding tongs and intended for the welding of the free wire ends to one grid is provided on the other side of the feed paths in alignment with the wire feed routes, and a welding device having welding tongs and intended for welding the cut ends of the web wires to the other grid is provided on this side of the feed paths downstream in the feed direction, characterized in that the feed paths (6) in accordance with the bending radius of the grid body to be fabricated, are curved in a circular shape and are also arranged concentrically and have a common vertical axis, in that the grid feeding station (A) allocated to the feed paths is equipped with bending mechanisms (2a, 2b) for the two grids (3a, 3b), in that the web-wire feeding station (9) downstream from the grid feeding station (A) in the feed direction is arranged on the outside of the feed paths, in that the web-wire feeding station (9) as well as the welding devices (13a, 13b) are mounted in such a way that they can be pivoted towards and away from the feed paths, and in that a removal station (E) for the finished grid bodies is likewise provided on the outside of the feed paths.

5. Apparatus according to claim 4, characterized in that, inside the group of feed paths, at least one further group of circular feed paths having a smaller radius is provided to fabricate grid bodies having different curvature, the feed-path groups touching one another in the area of the web-wire feeding station (9).

6. Installation according to claim 4, characterized in that, in order to work grids fed in the form of endless grid lengths (3a, 3b), guide and feed devices (17, 17') for the grid lengths and the grid body as well as, in front of the removal station (E), a mechanism (20) for cutting to length the finished grid bodies are provided on the feed paths (6).

7. Installation according to claim 4, characterized in that, in order to work grids in the form of grid mats (3a, 3b), at least one grid-mat clamping mechanism (7) is provided which is guided on a track (6) defining the feed paths and can be moved out of the grid feeding station (A) through the web-wire feeding and welding stations (9; 12a, 12b) into the grid-body removal station (E).

8. Installation according to claim 7, characterized in that the clamping mechanism (7) has a movable frame (66; 66') which in plan view is curved in accordance with the circular track (6), and a rotary mounting (15) for the frame (66) is provided in the centre of the track (6).

9. Installation according to claim 7, characterized in that, when there are a plurality of circular tracks (6$_1$, 6$_2$), the rotary mounting (15$_1$, 15$_2$) for the frame (66; 66') of the clamping mechanism (7) is adjustable along a track diameter.

10. Installation according to claim 4, characterized in that the web-wire feeding station (9) has a plurality of web-wire feeding mechanisms (11) which are arranged one above the other in the vertical direction, can be adjusted relative to one another in this direction and secured in position, and are preferably provided with two web-wire feeding means each whose web-wire feed routes run in opposite directions at an angle to the tangential plane of the track (6), and in that the welding tongs (42) allocated to the web-wire feeding mechanisms (11) are likewise arranged in such a way that they can be adjusted in the vertical direction and secured in position.

11. Installation according to any of claim 4, characterized in that the web-wire feeding station (9) and the welding stations (12a, 12b) are mounted in such a way that they are displaceable on a base plate relative to one another and towards the feed paths (6) and, preferably for the purpose of changing the angle at which the web wires are fed to the feed, are pivotable about a vertical axis (39 and 50 respectively).

12. Installation according to claim 4, characterized in that each welding device (13a, 13b) essentially consists of a welding-tongs stand (44), the welding tongs (42) and the bus-bars (47), which are mounted in the welding station (12a, 12b) in such a way that they are pivotable by means of a pivot mounting and a pivot drive (51, 52) towards the grid feed paths (6).

13. Installation according to claim 4, characterized in that in each case two or more web-wire feeding stations (9) and allocated welding stations (12a, 12b) connected one behind the other in the feed direction of the grids are provided.

14. Installation according to claim 4, characterized in that the web-wire feeding station (9), or at least one web-wire feeding station (9), is equipped with web-wire feeding mechanisms which can be loaded with web wires, cut to length beforehand, from a magazine (18) by means of a feeder (19).

15. Installation according to claim 6, characterized in that the clamping mechanism (7) is equipped with a drive device (8) which effects the drive from the grid feeding station (A) up to the first welding station (12a) and from the second welding station (12b) into the removal station (E) as well as from the latter further into the grid feeding station (A), in that the rack of the web-wire feeding station (9) has a further drive device (14) which can be set in drive connection with the clamping mechanism (7) and takes over the cyclic feed of the clamping mechanism essentially through the first welding station (12a), and in that the frame of the second downstream welding station (12b) has a third drive device (14') which can be set in drive connection with the clamping mechanism (7) in order to convey the latter in cycles essentially through the second welding station.

16. Installation according to any of claim 6 characterized in that positioning and centering devices (59, 61a, 61b) for the longitudinal and cross wires of the grids as well as devices (62–65) for clamping the grids in place are provided on the frame (66; 66') of the mat clamping mechanism (7).

* * * * *